US005788741A

United States Patent [19]
Burton et al.

[11] Patent Number: 5,788,741
[45] Date of Patent: Aug. 4, 1998

[54] VIRTUAL IMPACTOR PROCESS FOR REMOVING PARTICLES FROM AN AIR STREAM

[75] Inventors: Robert M. Burton, Raleigh, N.C.; Petros Koutrakis, Wellesley; Costas Sioutas, Boston, both of Mass.

[73] Assignees: United States of America as represented by the Administrator of the U.S. Environmental Protection Agency, Washington, D.C.; President and Fellows of Harvard College, Cambridge, Mass.

[21] Appl. No.: 787,879

[22] Filed: Jan. 23, 1997

Related U.S. Application Data

[60] Continuation of Ser. No. 384,251, Feb. 6, 1995, abandoned, which is a division of Ser. No. 57,748, May 5, 1993, Pat. No. 5,425,802.

[51] Int. Cl.$^6$ .................................................. B01D 45/08
[52] U.S. Cl. ................................................ 95/32; 55/270
[58] Field of Search .................. 95/32, 267; 55/270, 55/462–464; 209/143, 145

[56] References Cited

U.S. PATENT DOCUMENTS

| | | | |
|---|---|---|---|
| 485,915 | 11/1892 | Duckham | 95/32 |
| 2,607,439 | 8/1952 | Dickens et al. | 95/32 |
| 3,891,551 | 6/1975 | Tiedemann | 210/777 |
| 3,945,532 | 3/1976 | Marks | 222/55 |
| 4,132,894 | 1/1979 | Yule | 250/435 |
| 4,196,170 | 4/1980 | Cemenska | 422/171 |
| 4,246,788 | 1/1981 | Olin et al. | 73/863.03 |
| 4,301,002 | 11/1981 | Loo | 73/28.05 |
| 4,452,068 | 6/1984 | Loo | 73/28.05 |
| 4,670,135 | 6/1987 | Marple et al. | 209/143 |
| 4,689,052 | 8/1987 | Ogren et al. | 55/338 X |
| 4,767,524 | 8/1988 | Yeh et al. | 209/143 |

(List continued on next page.)

FOREIGN PATENT DOCUMENTS 624264  7/1961  Canada ........................ 95/32

OTHER PUBLICATIONS

Sioutas et al., A High Volume Small Cutpoint Virtual Impactor for Separation of Atmospheric Particulate from Gaseous Pollutants, Particulate Science and Technology, 12:207–221, 1994.

Marple et al., *Inertial, Gravitational, Centrifugal, and Thermal Collection Techniques*, (206–232), Undated.

Marple et al., Virtual Impactors: A Theoretical Study, *Environmental Science & Technology* (14:976–984), 1980.

da Roza, A Slit Impactor For Eliminating the Larger Particles from a Polydispersed Aerosol, *AEROSOLS* (557–560), 1986.

Conner, An Inertial–Type Particle Separator for Collecting Large Samples, *APCA Journal* (16:35–37), 1966.

Biswas et al., The Particle Trap Impactor, *Journal Aerosol Research* (13:113–121), 1988.

Masuda et al., Classification Performance of a Rectangular Jet Virtual Impactor—Effect of Nozzle Width Ratio of Collection Nozzle to Acceleration Jet, *Journal of Aerosol Research* (19:243–252) 1988.

Marple et al., *Inertial Impactors: Theory, Design and Use* (412–445), Undated.

Marple et al., *Environmental Science & Technology* (8:648–654), 1974.

Loo et al., Dichotomous Virtual Impactors for Large Scale Monitoring of Airborne Particulate Matter, in *Fine Particles: Aerosol Generation, Measurement, Sampling, and Analysis* (B.Y.H. Liu, ed. 312–349), 1976.

*Primary Examiner*—Richard L. Chiesa
*Attorney, Agent, or Firm*—Bell Seltzer Intellectual Property Law Group of Alston & Bird, L.L.P.

[57] ABSTRACT

A virtual impactor that can remove essentially all of the particles from an airstream is disclosed. Disclosed are a method of separating particles from the airstream using this virtual impactor, a method of concentrating the particulate matter in an airstream, and the concentrated airstream.

20 Claims, 9 Drawing Sheets

U.S. PATENT DOCUMENTS

| | | | |
|---|---|---|---|
| 4,808,827 | 2/1989 | Woollam | 250/370.02 |
| 4,863,491 | 9/1989 | Brandt et al. | 55/277 X |
| 4,872,972 | 10/1989 | Wakabayashi et al. | 209/143 |
| 4,940,327 | 7/1990 | Lillienfeld | 356/338 |
| 4,972,957 | 11/1990 | Liu et al. | 209/143 |
| 5,006,227 | 4/1991 | Behm et al. | 209/143 |
| 5,020,470 | 6/1991 | West et al. | 118/326 |
| 5,040,424 | 8/1991 | Marple et al. | 73/863.23 |
| 5,176,723 | 1/1993 | Liu et al. | 55/222 X |
| 5,183,481 | 2/1993 | Felder | 55/392 X |
| 5,425,802 | 6/1995 | Burton et al. | 95/32 |

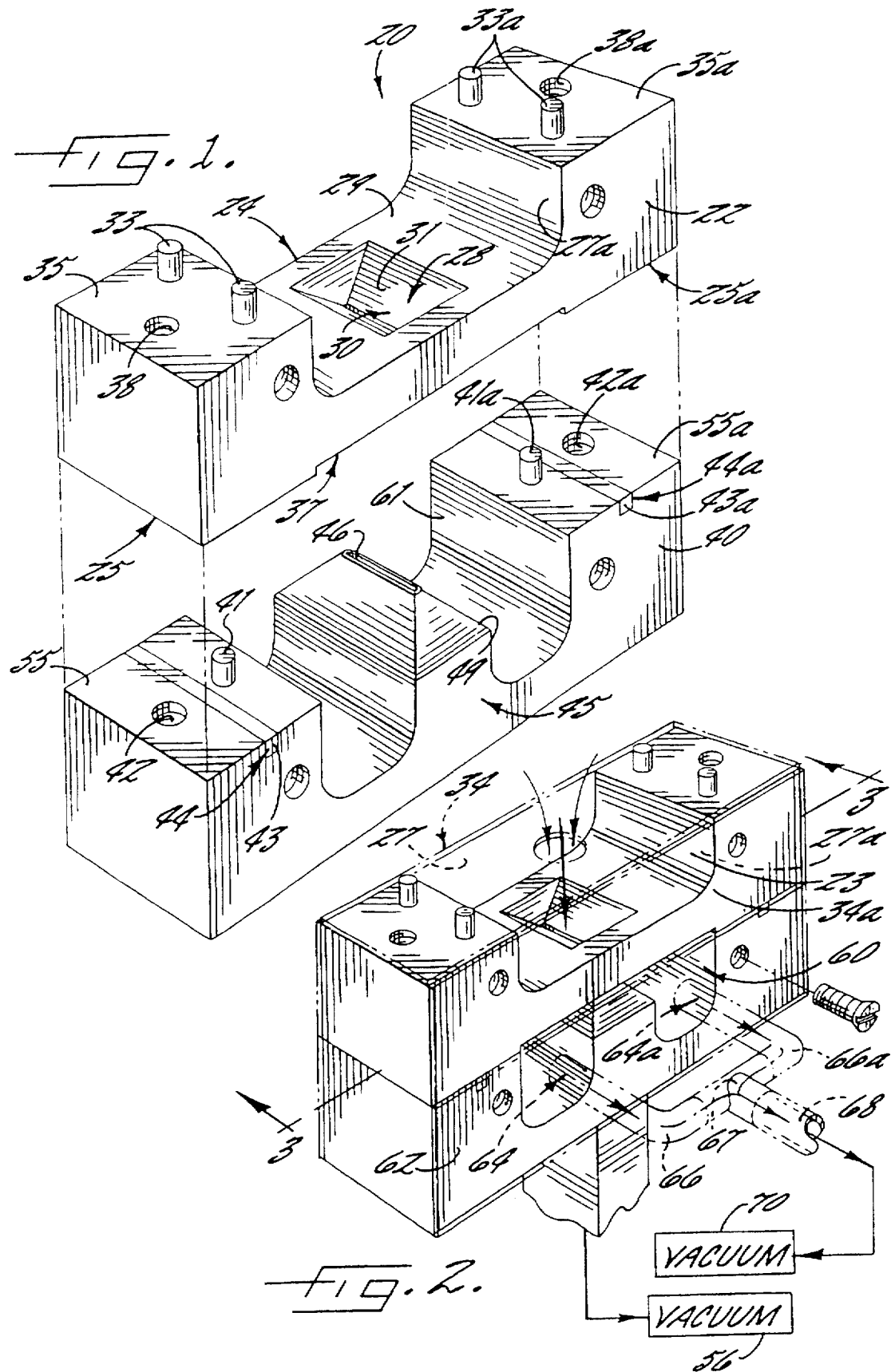

1

VIRTUAL IMPACTOR PROCESS FOR REMOVING PARTICLES FROM AN AIR STREAM

This application is a continuation, of application Ser. No. 08/384,251, filed Feb. 6, 1995, now abandoned, which is a divisional of prior application Ser. No. 08/057,748, filed May 5, 1993, which is now U.S. Pat. No. 5,425,802, the disclosure of which is incorporated by reference herein in its entirety.

FIELD OF THE INVENTION

This invention relates generally to separating particles from an airstream, and more particularly relates to separating particles larger than 0.1 micrometers from an airstream with a virtual impactor.

BACKGROUND OF THE INVENTION

Particle classification according to aerodynamic size can be carried out with a number of different devices, including elutriators, cyclones, centrifuges and impactors. Inertial impactors have been widely used for particle collection, mainly because of their sharp cut-off characteristics. Due to extensive theoretical work on inertial impactors, see, e.g., Marple, V. A. and Liu, B. Y. H. "Characteristics of laminar jet impactors." *Environm. Sci.& Techn.* 1974, 7:648–654; Marple, V. A. and Willeke, K. In "Fine Particles: Aerosol generation, measurement, sampling, and analysis." (B. Y. H Liu ed.) 1976, the performance of inertial impactors has become well understood and in many instances their characteristics can be predicted. The most important limitations of these instruments are the following: (i) particles may bounce from the collection surface upon impaction; (ii) collected particles may reentrain in the airstream; (iii) wall losses between the impactor stages may be considerable; and (iv) very large particles may break-up upon impaction, especially at high impaction velocities. See Biswas, P. and Flagan, R. C. "The particle trap impactor". *J.Aer. Sci.* 1988: 19:113–121. The particle bounce problem has been traditionally encountered by coating the impaction plates with a sticky material. However, carbon-containing coatings that are typically used may interfere with the measurement of carbonic compounds.

The virtual impactor provides an alternative solution to the problems of particle bounce and reentrainment. Similar to inertial impactors, virtual impactors classify particles according to aerodynamic size. In this device, a jet of particle-laden air is accelerated toward a collection probe which is slightly larger than the acceleration nozzle and which is positioned downstream from the accelerator so that a small gap exists therebetween. See Loo, B. W., Jaklevic, J. M., and Goulding, F. S. In "Fine Particles: Aerosol generation, measurement, sampling, and analysis." (B. Y. H. Liu ed.) 1976. A vacuum is applied that deflects a major portion of the accelerated airstream through this small gap rather than permitting it to continue straight and thereby enter the collection probe. Particles larger than a certain threshold size (known as the cutpoint) have sufficient momentum that they cross the deflected streamlines and enter the collection probe, whereas particles smaller than the cutpoint follow the deflected streamlines. The larger particles are removed from the collection probe by the minor portion of the airstream, the quantity of which is determined by the magnitude of the vacuum applied to the major portion of the airstream and the magnitude of a vacuum applied to the minor portion. The minor flow generally contains a small fraction of fine particles also. The concentration of the larger particles in the minor flow increases by a factor of $Q_{tot}/Q_{min}$, where $Q_{tot}$ is the total flow entering the virtual impactor and $Q_{min}$ is the minor flow.

Studies have shown that essentially all of the particle mass of ambient air is of a size greater than 0.1 μm. Despite the advantages described above, conventional virtual impactors with a cutpoint approaching this value have not been disclosed. Equations 1 and 2 below demonstrate the technical impediments to such an impactor.

$$St = \frac{\rho_p C_c d_p^2 U}{9 \mu D_j} \tag{1}$$

wherein St is the Stokes number, a dimensionless parameter relating the jet velocity and the nozzle diameter, $D_j$ is the acceleration nozzle diameter (cm), U is the average velocity of the jet (cm/s), $\rho_p$ is the particle density (g/cm$^3$), μ is the dynamic viscosity of the air ($1.8*10^{-4}$ g/cm s), and $C_c$ is the Cunningham slip correction factor as given in Equation 2

$$C_c = 1 + \frac{2}{Pd_p}\,[6.32 + 2.01\exp(-0.1095Pd_p)] \tag{2}$$

wherein P is the absolute pressure in cm Hg and $\rho_p$ is the particle diameter in μm. Because St is a dimensionless parameter, equation (1) indicates that the square root of St provides a measure of the dimensionless particle diameter. As seen in equation (1), either a very high jet velocity (resulting in low pressures downstream of the jet nozzle) or a very small orifice must be used in order to create a virtual impactor with a 0.1 μm cutpoint. For example, Biswas et al., supra, developed a virtual impactor that operated at jet velocities comparable to the sonic limit to separate particles in the order of 0.1 μm. U.S. Pat. No. 5,183,481 to Felder discloses a supersonic virtual impactor with a 0.1 μm cutpoint. Because of the high jet velocity and corresponding high pressure drop required for such a virtual impactor, these designs are not practical for widespread use. Small orifice impactors have not been reported; had they been constructed, they also would be impractical, as the flow rate is extremely low.

Masuda, H. and Nakasita, S. "Classification performance of a rectangular jet virtual impactor-effects of nozzle width ratio of collection nozzle to acceleration nozzle." *J.Aer. Sci.* 1988, 19:243–252, report the use of flow visualization techniques to examine the problem of particle losses in a slit-nozzle virtual impactor. The experiments indicated the formation of a turbulent periodic eddy in the collection probe. The eddy residence time increased with increasing collection-to-acceleration slit widths, resulting in a more unstable flow. The causes of this eddy formation were related to flow instabilities arising from the reduction of the flow velocity and the abrupt pressure recovery in the enlarged collection probe. The separation efficiency in those experiments was considerable lower than that predicted theoretically, thus resulting in a larger cutpoint than desired.

Thus a first object of the present invention is to overcome the deficiencies of the prior art and provide a virtual impactor having a 0.1 μm cutpoint.

A second object of the present invention is to provide a virtual impactor having such a cutpoint that can be operated at practical airstream flow rates.

A third object of the present invention is to provide a method for separating all of the particles of an airstream from all of the gas components of the airstream.

SUMMARY OF THE INVENTION

These objects and others are satisfied by the present invention, which as a first aspect provides a virtual impactor having a 0.1 μm cutpoint and thus is capable of removing virtually all of the particulate mass from an airstream. The virtual impactor of the present invention comprises nozzle means for accelerating an entering airstream, particle receiving means positioned downstream from the nozzle means, and a chamber in fluid communication with the gap between the nozzle means and the receiving means. The nozzle means comprises an inlet and an elongated outlet having a width dimension of between about 0.007 and 0.010 inches, and further having a longitudinal axis normal to and passing through the center of the elongated outlet. The particle receiving means comprises an elongated inlet having a width dimension of between about 0.013 and 0.015 inches and an outlet, and further has a longitudinal axis normal to and passing through the center of the elongated inlet. The particle receiving means is positioned downstream from the outlet of the nozzle means so that the flow gap therebetween is between about 0.008 and 0.012 inches, and is further positioned so that the longitudinal axis of the nozzle means and the longitudinal axis of the receiving means are substantially coaxial and so that the width dimension of the nozzle means outlet and the width dimension of the receiving means inlet are substantially parallel. The chamber is configured to be in fluid communication with a vacuum source, as is the outlet of the particle receiving means.

A second aspect of the present invention is an apparatus for separating the particles from an airstream comprising the virtual impactor described above, first vacuum means fluidly connected to the chamber, and second vacuum means fluidly connected to the outlet of the particle receiving means.

A third aspect of the present invention is an apparatus for sampling the components of an airstream comprising the virtual impactor described above, a first vacuum means fluidly connected to the chamber, a second vacuum means fluidly connected to the outlet of the particle receiving means, particle collection means fluidly connected to the outlet of particle receiving means upstream of the second vacuum means, and gas collection means fluidly connected to the outlet of the particle receiving means upstream of the second vacuum means.

A fourth aspect of the present invention is a method for removing the particulate component of an airstream comprising passing air into the nozzle means of the virtual impactor described above, drawing a first portion of the airstream into the particle receiving means, and drawing a second portion of the airstream into the chamber so that substantially all of the particles of the airstream flow with the first portion of the airstream and enter the particle receiving means.

A fifth aspect of the invention is a method for concentrating the particulate components of an airstream comprising passing air into the nozzle means of the virtual impactor described above, drawing a first major portion of the airstream into the particle receiving means, and drawing a second minor portion of the airstream into the chamber so that the major portion of the airstream is substantially free of particulate matter. Preferably, these steps are repeated on the minor portion of the airstream until the particulate matter therein is desirably concentrated.

A sixth aspect of the present invention is an airstream having a concentrated particulate component produced by the concentrating method described above.

BRIEF DESCRIPTION OF THE DRAWINGS

FIG. 1 is an exploded perspective view of a virtual impactor.

FIG. 2 is a perspective view of the virtual impactor of FIG. 1 as assembled.

DETAILED DESCRIPTION OF THE PREFERRED EMBODIMENTS

Figure 3:
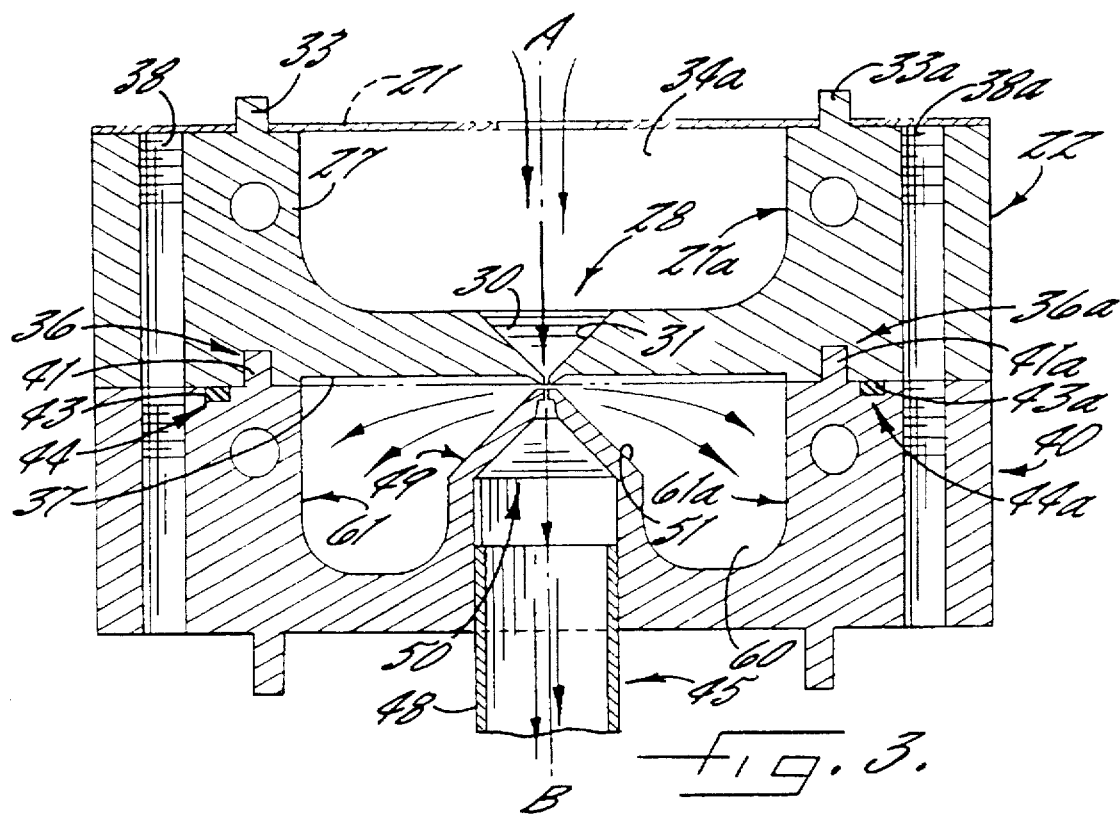
FIG. 3 is a cross-sectional elevational view of the virtual impactor.

The invention will now be described hereinafter in greater detail. The illustrated embodiment is not intended to be limiting; rather, it is presented to provide a more complete understanding of the invention to those skilled in this art.

The invention involves the separation of particles from an airstream containing particles with a virtual impactor. The airstream may have a substantially linear flow path with the virtual impactor, or it may veer, curve, bend, or otherwise deviate from a linear path. The position of structures comprising the illustrated embodiment of the invention will often be described herein as "upstream" or "downstream" of one another. As used herein, a structure being described as "upstream" of another structure means a flowing portion of the airstream reaches the first structure before reaching the second structure. Similarly, a structure being described as "downstream" of another structure means that a flowing portion of the airstream reaches the second structure prior to reaching the first structure.

In addition, the typical airstream to be used with the present invention contains both particulate and gaseous contaminants. The overwhelming majority of the particulate mass of an airstream comprises particles greater than 0.1 μm in diameter. Also, these are the particles, such as sulfates, nitrates, and the like, that pose the greatest health hazards to human respiration. Because of these two factors, the relatively few and harmless particles less than 0.1 µm in diameter are of considerably less interest to researchers, and are generally treated in the same manner as gaseous contaminants.. In view of this customary treatment, herein particles greater than 0.1 µm in diameter will be referred to as particles, and particles smaller than 0.1 µm and gaseous contaminants will be referred to as gases.

Further, typically a virtual impactor is described as having a specific "cutpoint". This term refers to the particle size above which a given particle has sufficient momentum to cross deflected streamlines and thus flow from the acceleration nozzle of the impactor to the adjacent collection tube irrespective of its cross-sectional location within the acceleration nozzle. In contrast, particles smaller than the cutpoint and gases follow their respective streamlines; those carried by the portion of the airstream that is deflected are also deflected, and those carried by the portion of the airstream that flows into the collection tube also flow into the collection tube. The cutpoint is determined by measuring the particle size at which 50 percent of the particles of that size flow into the collection tube and 50 percent of the particles of that size follow the deflected streamlines. The "efficiency" of a virtual impactor for a particular particle size is the percentage of the number of correctly sorted particles relative to the total number of particles in the airstream. Efficiency values for different particle sizes are not only indicative of the cutpoint value, but can also indicate the overall effectiveness of the impactor for other particle sizes. The "particle loss" for an airstream represents the percentage of particles that reach neither the collection tube nor the receiving chamber for smaller particles, but that instead adhere to some structure of the virtual impactor, such as the nozzle or the collection tube inlet. The particle loss value is also indicative of the overall effectiveness of the impactor; values approximately equal to or below 10 percent are generally regarded as acceptable.

Referring now to the drawings, FIG. 1 illustrates broadly at 20 a virtual impactor of the present invention. The virtual impactor 20 comprises a nozzle block 22 and a collection block 40, although those skilled in this art will appreciate that the virtual impactor 20 can be constructed of one, two, three, or even more separate pieces and still be suitable for use with this invention. The nozzle block 22 includes a pair of lower lateral surfaces 25, 25a, which include alignment notches 36, 36a (FIG. 3), a pair of upper lateral surfaces 35, 35a, from which emanate alignment pins 33, 33a, and a lower medial surface 37 that extends between the lower lateral surfaces 25, 25a. The collection block 40 includes a pair of upper lateral surfaces 55, each of which supports an alignment pin 41, 41a configured to be received by one of the alignment notches 36, 36a of the nozzle block 22. The upper lateral surfaces 55, 55a also each include a gasket notch 44, 44a which receives a gasket 43, 43a that forms an airtight seal between the nozzle block 22 and the collection block 40. The nozzle block 22 and the collection block 40 are fastened (FIG. 2) by threaded fasteners (not shown) that are inserted through securing apertures 38, 38a, which extend vertically through the nozzle block 22, and that are further inserted through securing apertures 42, 42a, which extend vertically through the collection block 40. Those skilled in this art will appreciate that any number of methods for attaching the nozzle block 22 to the collection block 40, such as adhesive bonding, rivets, pressure clamps, welding, and the like, are suitable for use with this invention; it is preferred to use a method that permits the separation of the parts to a sufficient degree that they can be cleaned periodically.

Figure 4:
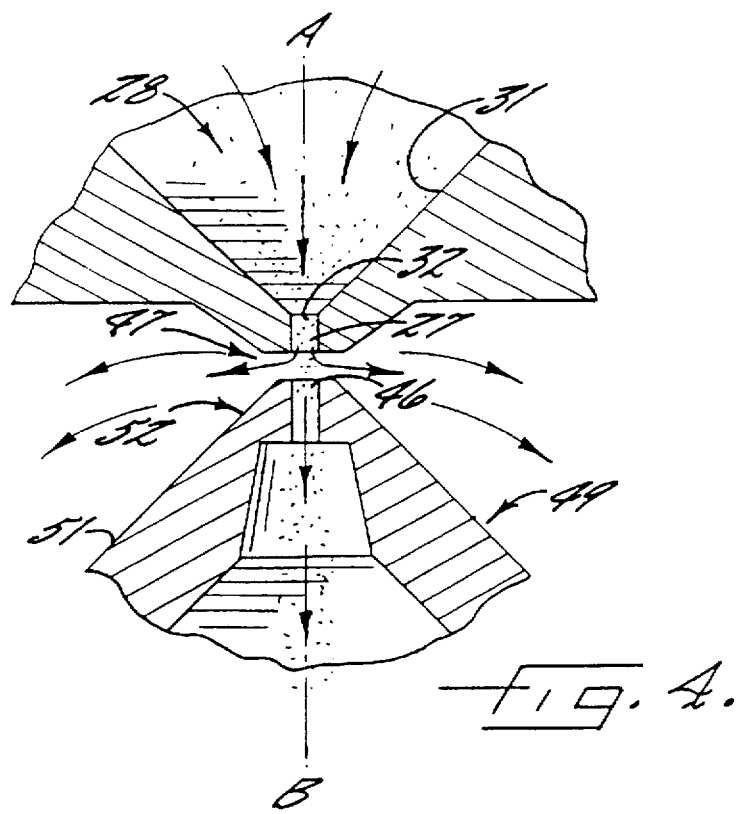
FIG. 4 is an enlarged view of the nozzle outlet and particle collection inlet of the virtual impactor.
Figure 5:
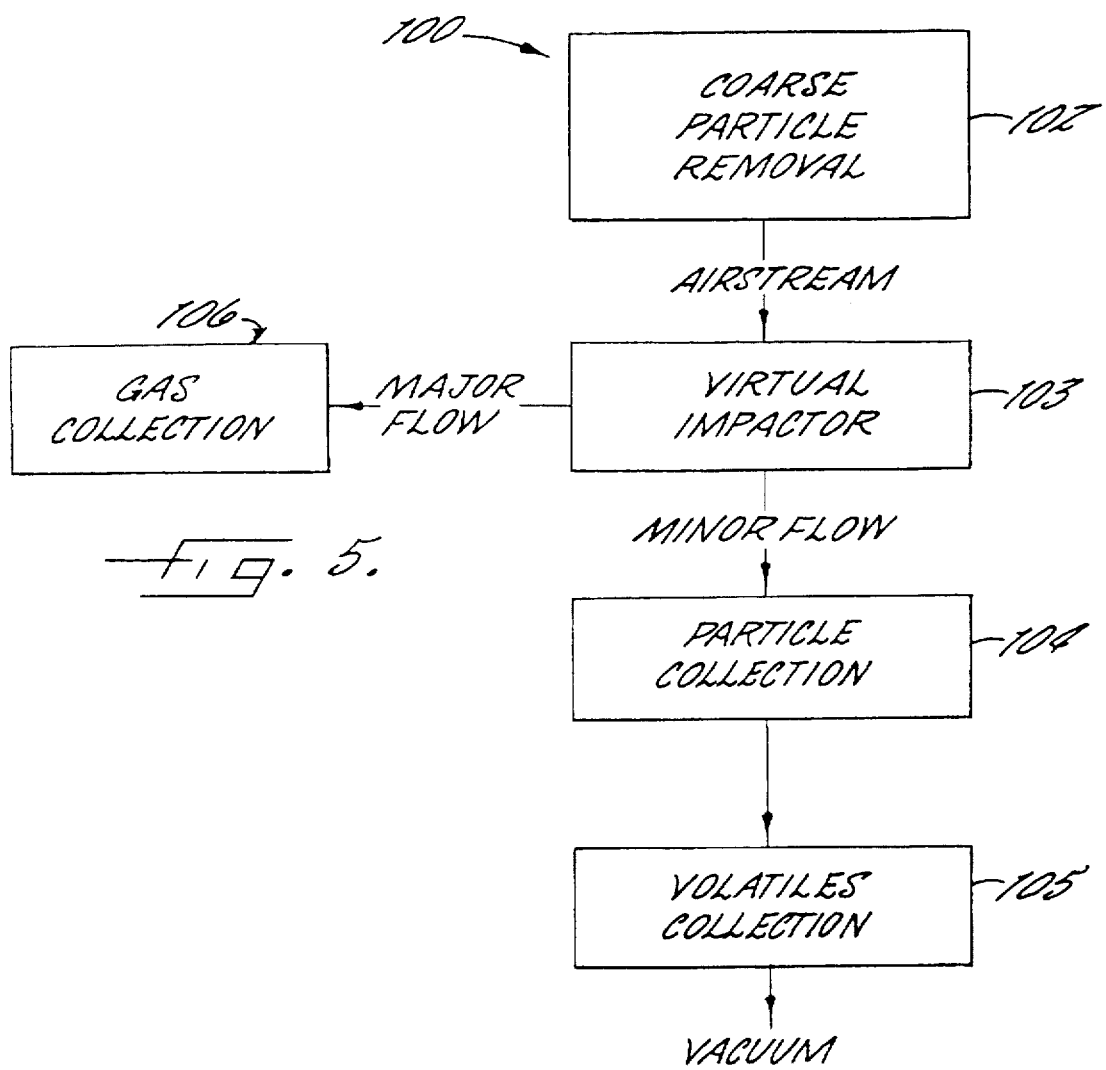
FIG. 5 is a schematic representation of an aerosol sampling apparatus employing a virtual impactor.
Figure 6:
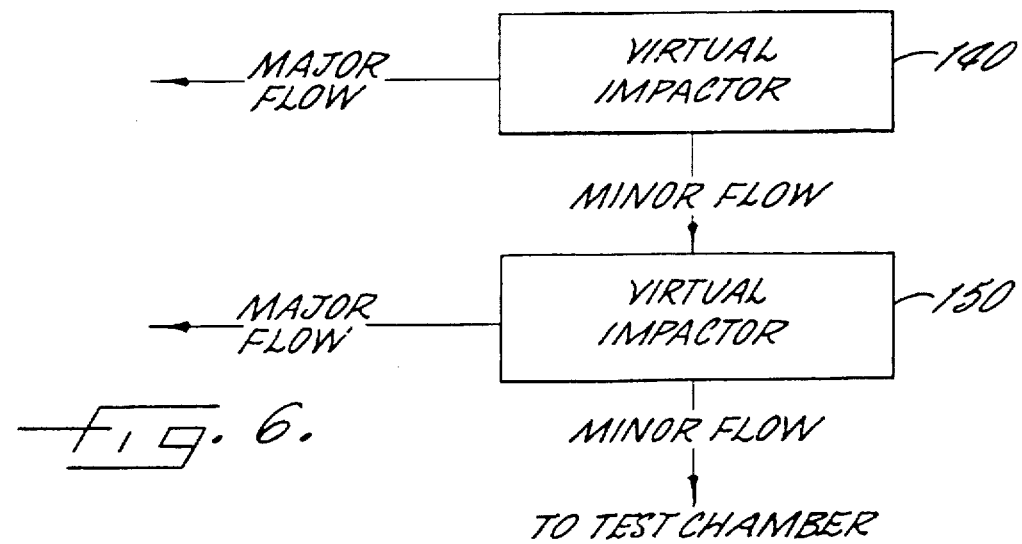
FIG. 6 is a schematic representation of particle concentrating apparatus employing a virtual impactor.

The nozzle block 22 includes an entry chamber 23, which is defined by an upper plate 21, a pair of side plates 34, 34a, a pair of lateral walls 27, 27a, and a lower internal surface 29 (FIG. 2). The upper plate 21 is fluidly connected to an airstream source S. An acceleration nozzle 24, best seen in FIGS. 3 and 4, comprises a recessed area positioned in the center of the lower internal surface 29. The acceleration nozzle 24 comprises an elongated funnel inlet 28 and an elongated outlet 27. The inlet 28 comprises a wide end 30 that is substantially coplanar with the lower internal surface 29 of the entry chamber 23, a narrowed end 32 that merges with the elongated outlet 27, (FIG. 4) and sloping surfaces 31 extending between the wide end 30 and the narrowed end 32. The funneled inlet 28 is included to enable the airstream to accelerate smoothly to the desired velocity for particle separation; preferably, the surfaces 31 are configured so that the angle formed between the sloping surface 31 and the longitudinal axis A of the elongated outlet 27 is greater than 30 degrees, although any configuration which causes the airstream to accelerate to a sufficient velocity for the formation of the desired streamlines exiting the acceleration nozzle 24 is suitable for use with this invention.

The outlet 27 is positioned downstream of the narrowed end 32 of the elongated funnel 28. The outlet 27 is a rectangular slot having a width dimension of between about 0.007 and 0.015 inches; the nozzle should be elongated in the length dimension so that the length dimension is greater than the width dimension; the actual length dimension of the outlet 27 is not critical, and in fact can be varied to permit the use of different flow rates through the nozzle. Preferably, the length dimension is 5, 10, 20, 40 or more times greater than the width dimension. Preferably the outlet has a length dimension of between about 0.5 and 10 inches so that the impactor can sustain a flow rate of between about 20 and 1,000 liters per minute. It will be apparent to those skilled in this art that although a rectangular outlet 27 is illustrated herein, any nozzle means having an elongated outlet with a width of between about 0.007 and 0.015 inches is suitable for use with the invention; alternative shapes include capsule-shaped and elongated hexagonal or octagonal nozzles. The nozzle has a longitudinal axis A that is parallel with the center of the flow path through the nozzle; i.e., the longitudinal axis is normal to and passes through the center of the elongated outlet 27.

The collection block 40 (FIG. 1) comprises a particle collection tube 45 and a gas receiving chamber 60. The particle collection tube 45 comprises a particle collection inlet 46, a hollow cuneate sleeve 49, and an outlet tube 48. The particle collection inlet 46 (FIG. 4) is elongated, has a width dimension of between about 0.012 and 0.021 inches, and further has a longitudinal axis B that is parallel to the flow path of the flow entering therein; i.e., the longitudinal axis B is normal to and passes through the center of the inlet 46. The inlet 46 is oriented so that the width dimension of the nozzle outlet 27 and the width dimension of the particle collection inlet 46 are substantially parallel and so that the longitudinal axis A of the outlet 27 and the longitudinal axis B of the inlet 46 are substantially coaxial. Preferably, the longitudinal axis A of the acceleration nozzle outlet 27 and the longitudinal axis B of the particle collection inlet 46 are misaligned by no more than 0.001 inches. The length dimension of the inlet 46 depends on the length dimension of the outlet 27; the inlet 46 should be at least between about 0.25 and 1.0 inches longer than the outlet 27. The inlet 46 is positioned downstream of the outlet 27 so that a streamline exit gap 47 of between about 0.008 and 0.015 inches is formed therebetween.

The hollow cuneate sleeve 49 comprises a narrowed end 52, a wide end 50, and sloping surfaces 51 extending therebetween. The narrowed end 52 merges with the particle collection inlet 46. In this embodiment, the sloping surfaces 51 descend from the narrowed end 52 so that the angle formed between the sloping surfaces 51 and the longitudinal axis B of the inlet 46 is about 45 degrees; an angle of at least 20 degrees is preferred to promote the formation of smooth streamlines that do not contact the sloping surface 51 during operation of the virtual impactor. The wide end 50 of the sleeve merges with the upstream end of the outlet tube 48.

The outlet tube 48 is fluidly attached to a vacuum pump 56 that draws a portion of the airstream exiting the nozzle outlet 27 through the particle collection inlet 46 and subsequently into and through the outlet tube 48. The percentage of the total airstream that comprises this branching flow depends on the magnitude of the negative pressure applied at the outlet 48. Generally this percentage is less than the percentage of the total airstream that flows into the gas receiving chamber 60; thus the branch flow through the inlet 48 is often termed the "minor flow". Preferably, the minor flow comprises less than 20 percent of the total flow, and more preferably comprises between 10 and 20 percent of the total flow. Those skilled in this art will appreciate that any means capable of producing a negative pressure in the particle collection tube 45, such as a vacuum pump, is suitable for use with this invention.

The gas receiving chamber 60 (FIG. 2) is defined by lateral internal walls 61, 61*a*, the medial lower surface 37 of the nozzle block 22, plates 62, 62*a*, and the external surfaces of the sleeve 49 and the outlet tube 48. The plates 62 each include an outlet aperture 64 for fluid connection with a vacuum pump 70. Those skilled in this art will appreciate that the shape of the chamber 60 is not limited to that illustrated herein, but rather can take any shape that retains fluid communication with the streamline exit gap 47 and the outlet apertures 64.

The outlet apertures 64 of the gas receiving chamber 60 are each connected to a conduit 66, 66*a*. The conduits 66, 66*a* meet to combine into a single flow at a T-joint 67, which then empties into a conduit 68. Conduit 68 leads to a vacuum pump 70. The vacuum pump 70 draws a portion of the airstream exiting the nozzle outlet 27 through the streamline exit gap 47, into and through the gas receiving chamber 60, the outlet apertures 64, the conduits 66, the T-joint 67, and the conduit 68. The percentage of the total airstream that comprises this branching flow depends on the magnitude of the negative pressure applied by the vacuum pump 70. As described above, generally this percentage is greater than the percentage of the total airstream that flows into the collection inlet 46; thus this branch flow is often termed the "major flow". Preferably, the major flow comprises greater than 80 percent of the total flow, and more preferably comprises greater than 90 percent of the total flow. Those skilled in this art will appreciate that any means capable of producing a negative pressure in the gas receiving chamber 60, such as a pump, is suitable for use with this invention.

In operation, the vacuum pumps 56 and 70 are activated, thus creating a negative pressure in both the gas receiving chamber 60 and the particle collection inlet 46. An air sample is introduced into the entry chamber 23 of the nozzle block 22. The air sample will typically contain particulate and gaseous contaminants. It is drawn then into the acceleration nozzle 24. The airstream is accelerated therein; the flow velocity of the airstream exiting the outlet 27 is preferably between about 50 and 140 meters per second. As the airstream exits the outlet 27 and enters the streamline exit gap 47, it is divided into a major flow, which is deflected into gas receiving chamber 60 due to the high negative pressure therein, and a minor flow that continues on an undeflected path across the gap 47 and into the particle collection inlet 46. In the configuration of the virtual impactor described herein, the particles present in the airstream have sufficient momentum that they are unable to follow the sharply deflected streamlines that enter the gas receiving chamber 60 and thus enter the inlet 46 with the minor flow. The minor flow also contains a percentage of the gas components of the airstream approximately equal to the ratio of the minor flow to the total flow. The remainder of the gas contaminants, because of their lower momentum, follow the deflected streamlines that comprise the major flow into the gas receiving chamber 60.

The virtual impactor of the present invention has a number of potential applications. One is schematically illustrated in FIG. 5, in which the virtual impactor is shown as a component in a aerosol sampling apparatus 100. The apparatus comprises a coarse particle virtual impactor 102, the virtual impactor of the present invention, designated broadly at 103, positioned downstream of the coarse particle virtual impactor 102, a particle collection filter 104 positioned downstream of the particle collection tube of the virtual impactor 103 to collect the particles contained in the minor flow, a first gas component trap 105 positioned downstream of the particle collection filter 104 to collect the gas components of the minor flow, and a second gas component trap 106 positioned downstream of the virtual impactor 103 to collect the gas components of the major flow.

It is desirable to gather and analyze the particles as a whole. It is also desirable to collect the particles in a manner that minimizes contact with gas contaminants, which can affect the characterization and measurement accuracy of collected particles by reaction with them or with the collection media. In the configuration illustrated herein, all particles of the airstream can be analyzed together as a single set that is collected on the collection filter 104; there is no need to collect different size particles in different traps, as has been the case for sampling apparatus using prior art virtual impactors. Also, at no point does the airstream containing all of the gas components flow through a particle filter and thus expose all of the filtered particles to these components; instead, the particles are exposed only to those gaseous contaminants that are present in the minor flow (usually 20 percent or less of the total gas contaminants); these are present in sufficiently low numbers that they do not unduly affect particle characterization accuracy. These gas components can be trapped in the first gas component trap 105. The gas components of the major flow are collected in the gas component trap 106; these results can be extrapolated to provide gas component data of the entire airstream.

Another application for the present invention is shown schematically in FIG. 6, which shows a pair of virtual impactors fluidly connected in series. A virtual impactor 140 receives an air sample and separates it as described above. The minor flow is directed to a second virtual impactor 150, which separates the minor flow in the same manner. The minor flow exiting the second virtual impactor 150 can then be directly piped to a test chamber to provide the sole air source for test specimens therein. The particulate contaminants present in the air provided to the test specimens are considerably more concentrated than in ambient air; as a result, accelerated studies on the effects of these contaminants can be conducted. It has not been possible previously to concentrate all of the particles present in an airstream in the same proportions to one another and in the same physical and chemical condition as those existing in the unconcentrated airstream.

Another application for which this device may prove useful include the simplified collection of particles from an airstream provided to an industrial "clean room", which requires particle-free air. An airstream can be drawn through the virtual impactor of the present invention; the particle-free major flow can then be directed into the clean room.

The invention is described in greater detail in the following examples. These examples are not intended to be limiting, but instead are included to provide those skilled in this art with a more complete understanding of this invention.

EXAMPLE 1

Configuration of Virtual Impactor with Round Nozzle

The virtual impactor used in testing consisted of three parts made of 6061 TG A1 stainless steel. The first part was an upper plate that included the acceleration nozzle, wherein the aerosol enters and gains sufficient momentum for impaction. Two different upper plates were constructed with nozzle diameters equal to 0.025 and 0.035 cm. The second part consisted of a collection tube having a diameter of 0.05 cm so that the ratio of the receiving to the acceleration nozzle was equal to 1.5 or 2, depending on which acceleration nozzle was employed. The distance between the acceleration nozzle and the receiving tube was maintained at 0.020 cm.

Because the axial alignment of the nozzle and the collection probe is important to minimizing losses on the collection probe tip, after the exterior dimensions of the nozzle plate and collection probe plate were machined, the two pieces were fitted together and doweled. The nozzle and collection probe were drilled simultaneously so that proper alignment was guaranteed. The two plates were then separated. The collection probe was reamed to 0.05 cm diameter and the tip was radiused. Thus, upon reassembly the nozzle and collection probe were properly aligned via the dowel pins.

Figure 7:
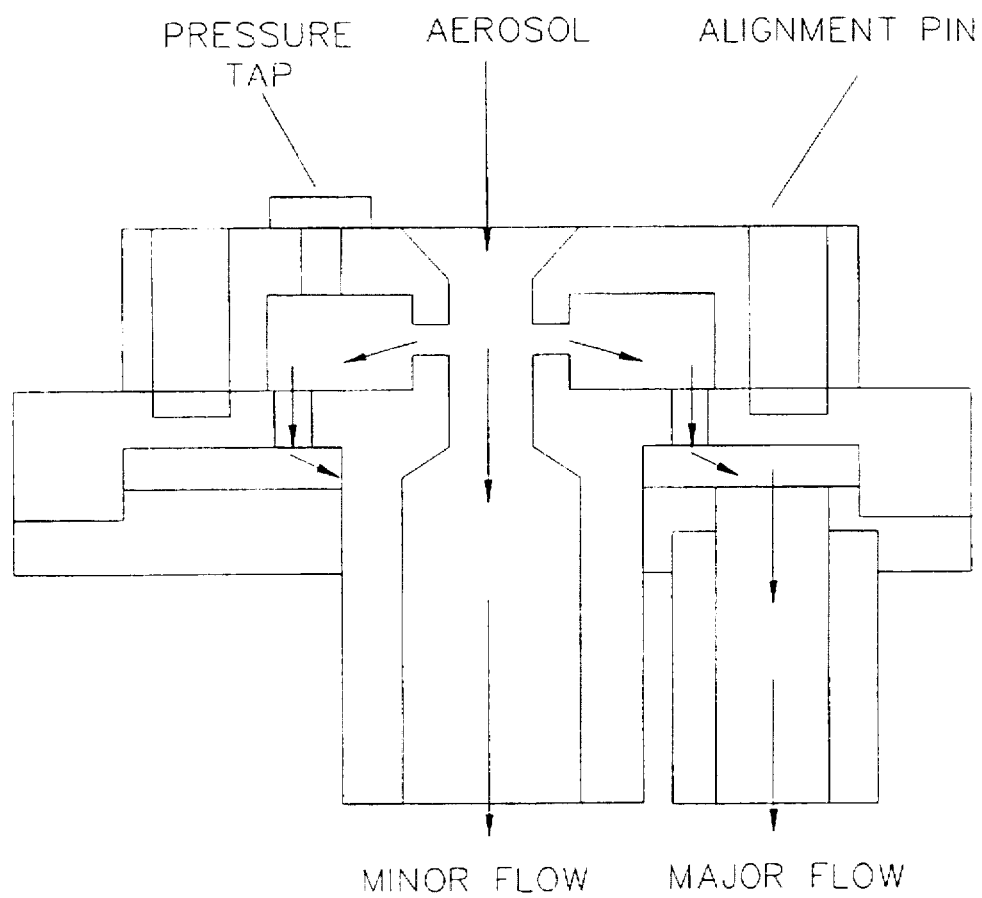
FIG. 7 is a schematic representation of a virtual impactor configuration having a round nozzle tested in Examples 1–6.

The collection probe plate included four ports (two of which are shown in FIG. 7), 0.07 cm in diameter each, through which the major flow was drawn. It was thought that using four holes of a similar size with the collection probe would distribute equally the flow over the entire plate and thus minimize particle losses due to unequal pressure distribution in the major flow.

The third part comprising the virtual impactor, an outlet tube for the major flow, was designed to mate with the second part through a snap-fit configuration. The three parts were held together by screws. Leaks were eliminated by placing O-rings in contact areas.

EXAMPLE 2

Preparation of Particles

Figure 8:
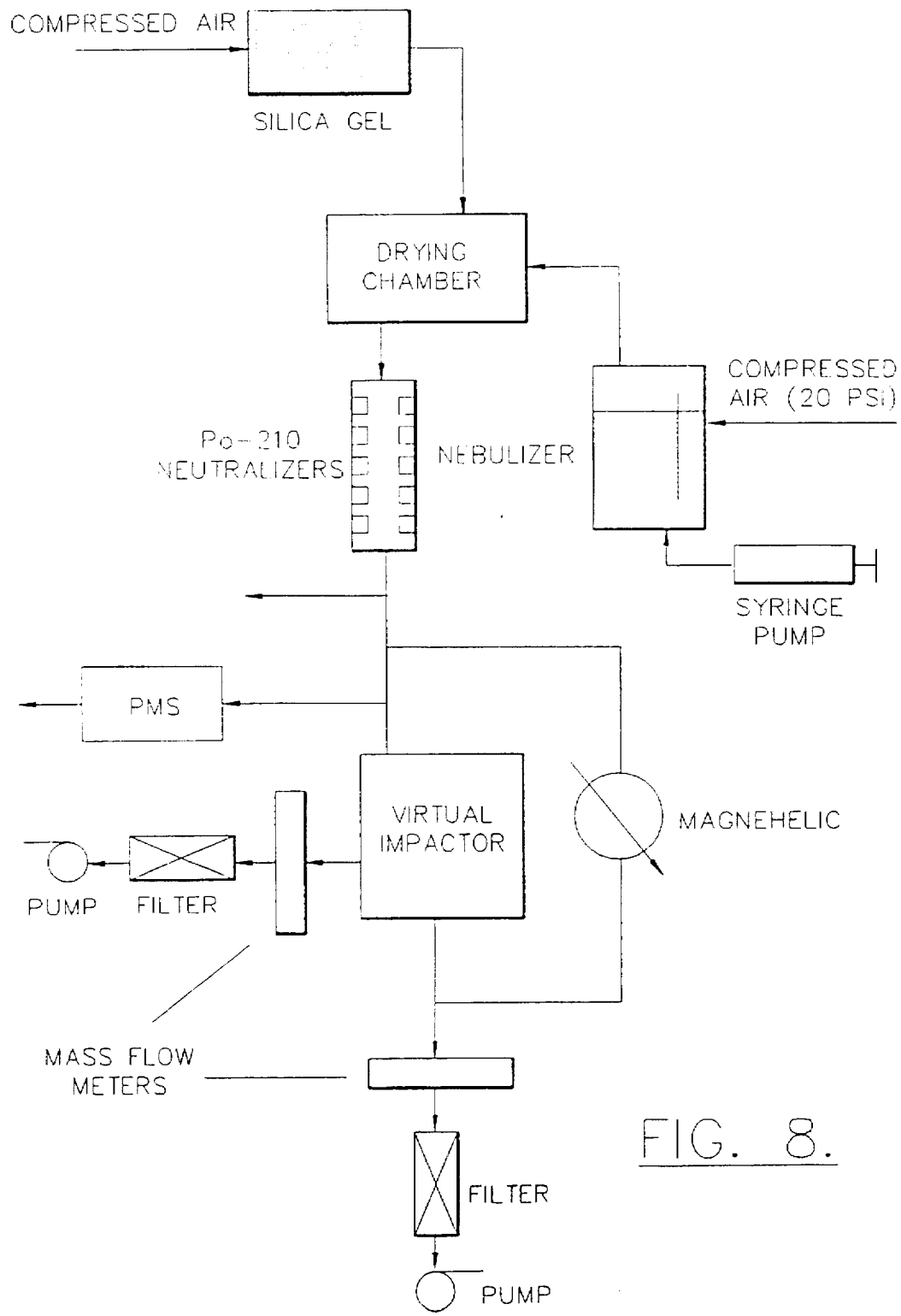
FIG. 8 is a schematic representation of the test apparatus employed in the testing of virtual impactor configurations.

The test system for the characterization of the virtual impactor of Example 1 is depicted in FIG. 8. Suspensions of 2.5% by weight yellow-green latex microspheres (Fluoresbrite, Polysciences, Warrington, Pa.) were nebulized by a pocket nebulizer (Retec X-70/N) using room air at 25 psi as described by Zeltner et. al (1991). The volumetric flow rate of the nebulizer was estimated to be approximately 5.5 LPM, and the output rate was approximately 0.25 cc/min of fluorescent suspension. The nebulizer was connected to a syringe pump in order to atomize large amounts (60 ml) of the fluorescent suspension. In addition, the output of the nebulizer was maintained constant to ensure a stable atomization process.

Seven different particle diameters were used in individual trials: 0.05, 0.12, 0.20, 0.45, 0.75, 1.1 and 2.0 µm. These particle sizes were selected to fully develop the collection efficiency curve of the virtual impactor, which was designed to have a 50% cut-off size of approximately 0.15 µm. The aerosol was subsequently dried in a 6-liter dry-air dilution chamber by mixing with filtered dry air at a flow rate of 10 LPM and passed through a 1-liter chamber containing ten Polonium 210 ionizing units (Staticmaster, NRD Inc.) to neutralize any particle charge.

EXAMPLE 3

Testing Apparatus and Procedure

A portion of the aerosol was drawn through a test apparatus (FIG. 8) consisting of the virtual impactor of Example 1 and a 47 mm glass fiber filter placed across each of the major and minor flows to collect test particles. Each filter was connected to a pump with a Matheson mass flow meter in line to maintain a constant flow rate throughout sampling. The aerosol passed through the test system at a total flow rate varying from 0.30 to 0.70 LPM, depending on which acceleration nozzle was used. The ratio of minor to total flow was varied from 0.1 to 0.2. The pressure drop across the virtual impactor was continuously monitored in every experiment with a Magnehelic pressure gauge (range 0–100 inches of water). In all the experiments the pressure gage showed a pressure drop varying from 35 to 50 inches of water across the virtual impactor depending on the virtual impactor configuration tested.

A second portion of the test aerosol was passed through an optical particle size analyzer (model LAS-X Particle Measuring System, Inc., Boulder, Colo.) which was used to record the particle size distribution throughout the experiment at a sampling flow rate of 1.5 LPM. The PMS laser spectrometer was calibrated prior to the experiments using polystyrene latex (PSL) particles (Polysciences, Warrington, Pa.). In every experiment the optical size analyzer confirmed that>95% of the particles were singlets.

EXAMPLE 4

Particle Collection Procedure

After a sufficient amount of the aqueous fluorescent suspension was nebulized (three hours of sampling), the two glass fiber filters were extracted using 5 ml of ethyl acetate as recommended by the manufacturer. Subsequently, the filters and the solution were ultrasonically treated for a short time to further encourage the transfer of particles from the filter to the extraction solution. The extraction solution was filtered through a new 1.0 µm nuclepore filter to remove glass fibers dislodged during the sonication.

The quantities of the fluorescent dye in the extraction solutions were measured by a fluorometer (FD-300 Fluorescence Detector, GTI, Concord, Mass.) to determine particle concentration. Linear regression analysis was performed for standards ranging from zero (ethyl acetate solution) to 1.5 mg of PSL particles per ml ethyl acetate. The method can detect as little as 1 µg of PSL particles per ml solution and can be used to linearly interpolate for concentrations up to about 1.5 mg of particles per ml of ethyl acetate solution.

The efficiency of the virtual impactor was determined by dividing the quantity of particles collected on the minor flow filter by the sum of the particle quantities collected on both major and minor flow filters. In addition, the acceleration nozzle, the collection probe and the inside surfaces of the virtual impactor were carefully washed with 10 ml of ethyl acetate each to determine particle losses through the system.

EXAMPLE 5

Results of Testing on Virtual Impactors with Round Nozzles a. Particle Loss and Collection Efficiency for Basic Virtual Impactor Configuration The basic virtual impactor configuration consisted of a jet nozzle diameter equal to 0.035 cm, a collection probe equal to 0.05 cm (thus providing a nozzle ratio of 1.4), a total flow through the nozzle of 0.56 LPM, and a minor to total flow ratio equal to 0.2. This configuration was tested as described in Examples 2–4. The pressure drop across the impactor was maintained at 35 inches of water.

Table 1 shows the results of the virtual impactor characterization.

This result conforms with observations reported in previous publications on virtual impactors reporting a maximum loss near the impactor's cutpoint. See. e.g., Loo, B. W. and Cork, C. P., "Development of high efficiency virtual impactors." *Aer. Sci. & Techn.* 1988, 9:167–176.

Most of the particles are lost on the tip of the collection probe (this was actually confirmed by visual observations of the tip of the collection probe, since the particles that were used were yellow-green fluorescent). The radius of the inner lip of the collection probe is important in minimizing the loss peak near the cutpoint. The losses in the collection probe increase with particle size, as large particles are able to cross the streamlines of the minor flow and adhere to the collection probe. Particles smaller than 0.25 µm in diameter are primarily lost on the external surfaces of the acceleration nozzle as they follow the deflected streamlines of the major flow. Particles larger than 1.1 µm in diameter are generally

TABLE 1

Particle collection characteristics of the virtual impactor.

| Particle Diameter (µm) | (%) in Major Flow (0.44 LPM) | (%) in Minor Flow (0.12 LPM) | (%) Collection Efficiency | (%) Total Losses | (%) Losses on inlet of nozzle | (%) Losses on collection probe | (%) Other interstage losses |
|---|---|---|---|---|---|---|---|
| 0.05 | 45.1 | 38.2 | 45.9 | 7.4 | 2.2 | 3.4 | 1.8 |
| 0.12 | 41.4 | 50.5 | 55.0 | 8.1 | 1.0 | 3.8 | 3.3 |
| 0.20 | 33.5 | 52.6 | 61.1 | 13.8 | 3.8 | 5.5 | 4.5 |
| 0.45 | 4.8 | 89.3 | 94.9 | 5.9 | 1.3 | 3.1 | 1.5 |
| 0.75 | 1.9 | 95.5 | 98.0 | 2.6 | 0.2 | 1.9 | 0.5 |
| 1.10 | 1.8 | 93.6 | 97.1 | 4.6 | 1.1 | 2.1 | 1.4 |
| 2.00 | 1.6 | 91.4 | 98.3 | 7.0 | 3.4 | 2.8 | 0.8 | a. The values in the table represent averages of repeated runs.
b. The minor flow ratio was 0.2.
c. The collection probe to acceleration nozzle ratio was 1.4 (nozzle diameter 0.035 cm)

The particle losses were classified into three categories: (a) particles lost in the acceleration nozzle (including its external surfaces); (b) particles lost around the edges and into the collection probe; and (c) particles lost in the major flow cavity.

Figure 9:
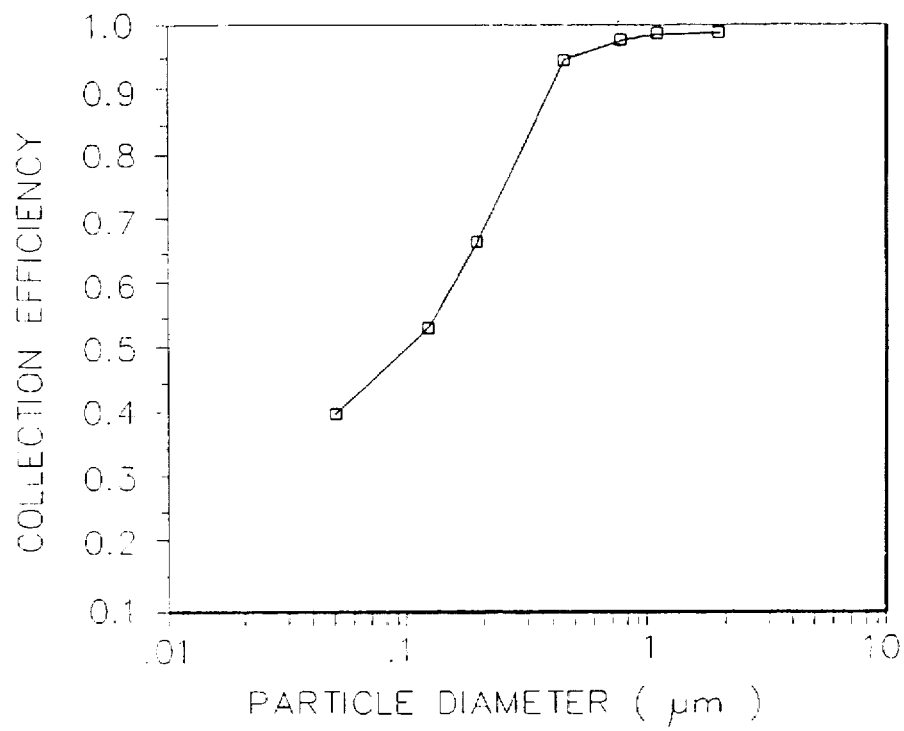
FIG. 9 is a plot of collection efficiency as a function of particle diameter for the round-nozzled virtual impactor tested in Examples 1–6.

The collection efficiency curve of the virtual impactor is shown in FIG. 9. It can be seen that the 50% cutpoint is between 0.1–0.15 µm. The cutpoint is smaller than the theoretical prediction for an inertial impactor (0.25 µm). This can be explained by the fact that the minor flow contains 20% of all particles smaller than the cutpoint. The point on the curve of FIG. 9 that corresponds to the traditional 50% cutpoint of an inertial impactor is in this case the 70% collection efficiency particle size, which from FIG. 9 is approximately 0.25 µm.

Figure 10:
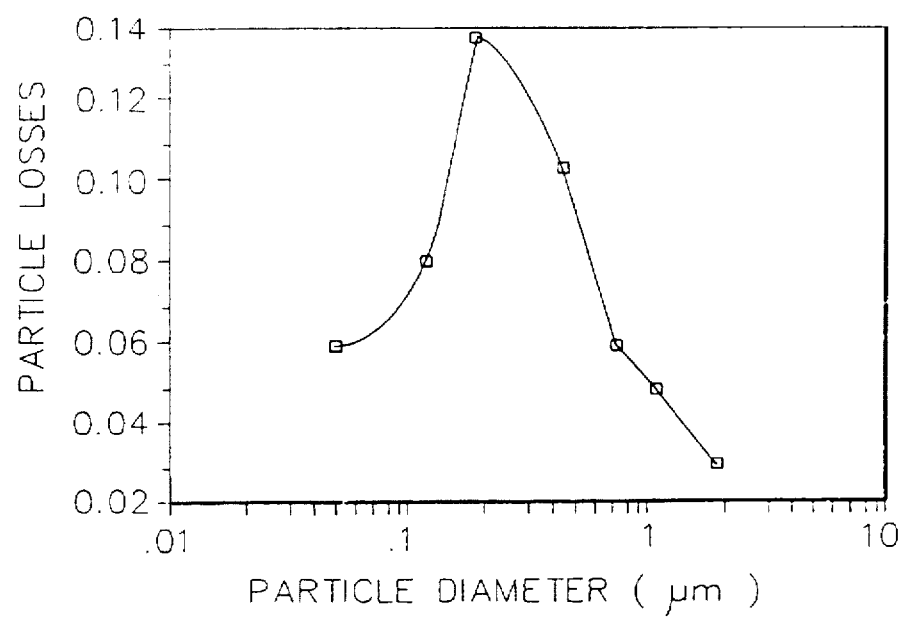
FIG. 10 is a plot of particle loss as a function of particle diameter for the virtual impactor tested in Examples 1–6.

Table 1 shows also the particle losses in the acceleration nozzle, the collection probe and the inside surfaces of the virtual impactor. In addition, FIG. 10 shows the total particle losses as a function of the particle size. Particle losses reach a maximum at a particle diameter of approximately 0.20 µm.

lost inside the acceleration nozzle due to the turbulence present as the flow converges and rapidly accelerates. It is interesting to notice in FIG. 10 that the overall losses are in the range 6–13.8% with the maximum occurring at 0.20 µm, which indicates that particle penetration through the virtual impactor is relatively uniform (in the range of 88–94%) for the entire size range tested.

b. Effect of Ratio of Collection Probe To Acceleration Nozzle

In order to test the effect of the collection probe to acceleration nozzle ratio on virtual impactor performance, the smaller acceleration nozzle (0.025 cm diameter) described in Example 1 was employed, thus providing the impactor with a ratio of 2. The total flow through the nozzle was 0.29 LPM in order to maintain the same velocity in the acceleration nozzle as used in the earlier trials. The minor flow ratio was 0.2, as in the main configuration.

The results of the virtual impactor evaluation are shown in Table 2.

TABLE 2

Particle collection characteristics of the virtual impactor with nozzle ratio 2.

| Particle Diameter (μm) | (%) in Major Flow (0.23 LPM) | (%) in Minor Flow (0.06 LPM) | (%) Collection efficiency | (%) Total losses | (%) Losses on inlet of nozzle | (%) Losses on collection probe | (%) Other interstage losses |
|---|---|---|---|---|---|---|---|
| 0.05 | 33.6 | 11.8 | 26.0 | 54.6 | 23.3 | 22.6 | 8.7 |
| 0.12 | 31.1 | 17.7 | 36.3 | 51.2 | 17.1 | 22.8 | 11.3 |
| 0.20 | 27.4 | 21.6 | 36.6 | 51.0 | 13.0 | 29.7 | 8.3 |
| 0.45 | 3.6 | 71.2 | 95.2 | 25.2 | 11.4 | 9.6 | 4.2 |
| 0.75 | 1.2 | 88.3 | 98.7 | 10.5 | 2.2 | 7.4 | 0.9 |
| 1.10 | 1.5 | 87.9 | 98.3 | 10.6 | 1.4 | 7.7 | 1.5 |
| 2.00 | 1.5 | 86.0 | 98.3 | 12.5 | 2.5 | 8.2 | 1.8 | a. The values in the table represent averages of repeated runs.
b. Minor flow ratio 0.20.
c. Acceleration nozzle diameter 0.025 cm.

Figure 11:
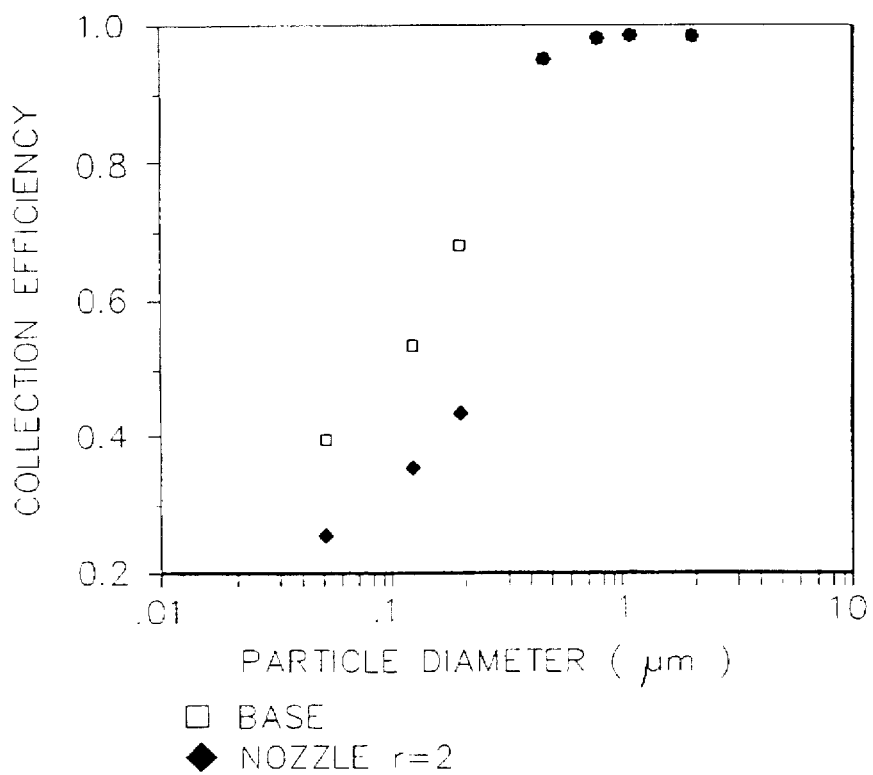
FIG. 11 shows plots comparing collection efficiency as a function of particle diameter virtual impactors having varying nozzle to collection tube ratios.
Figure 12:
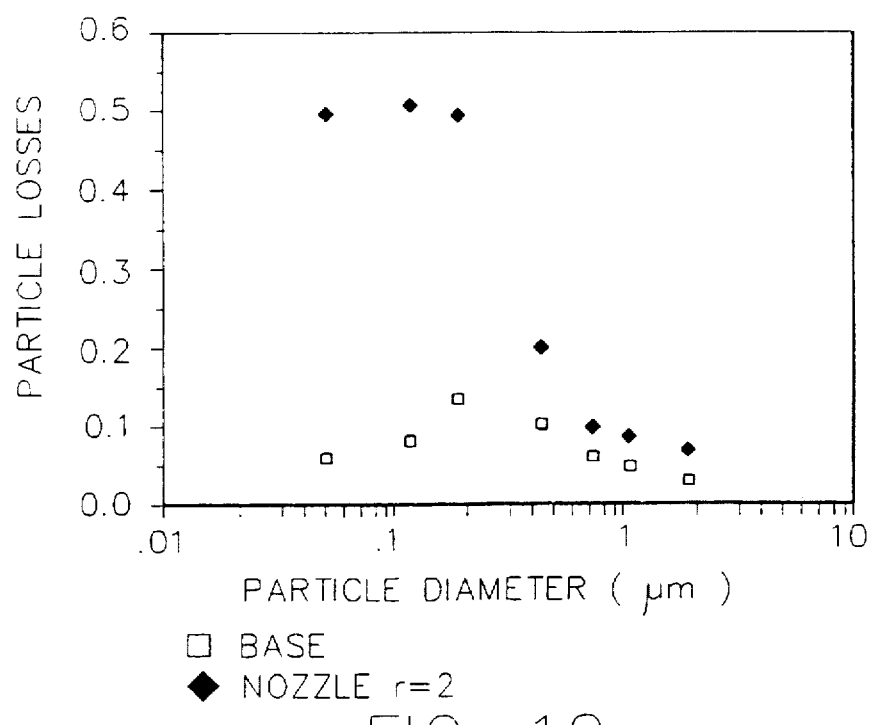
FIG. 12 shows plots comparing particle loss as a function of particle diameter for virtual impactors having nozzle to collection tube ratios.

In addition, the efficiency trends for the virtual impactor with the increased nozzle ratio and the main configuration are shown in FIG. 11. It can be seen that the collection efficiency of the virtual impactor with the increased collection-to-acceleration nozzle ratio drops significantly at smaller particles ($d_p < 0.25$ μm). The most striking result of the increase in the collection probe to acceleration nozzle ratio appears to be the dramatic increase of the particle losses, as shown in FIG. 12. In fact, most of the particles deposited on the external surface of the acceleration nozzle as well as the surface around the tip of the collection probe. The decrease in the collection efficiency is a direct consequence of the increase in the particle losses. It appears that as the diameter of the collection probe increases, there is sufficient space within the collection probe for many streamlines to make complete U-turns, which explains the very high losses of particles smaller than 0.5 μm on both the tip of the collection probe and the backside of the acceleration nozzle. This result is in agreement with the conclusions of Loo et. al. supra.

c. Effect of minor flow ratio

The effect of reducing the ratio of the minor flow to the total flow from 0.2 to 0.1 on the virtual impactor characteristics was investigated on the main configuration described in Example 1. The total pressure drop was 35 inches of water at a total flow rate of 0.56 LPM.

The results of this test are shown in Table 3.

Figure 13:
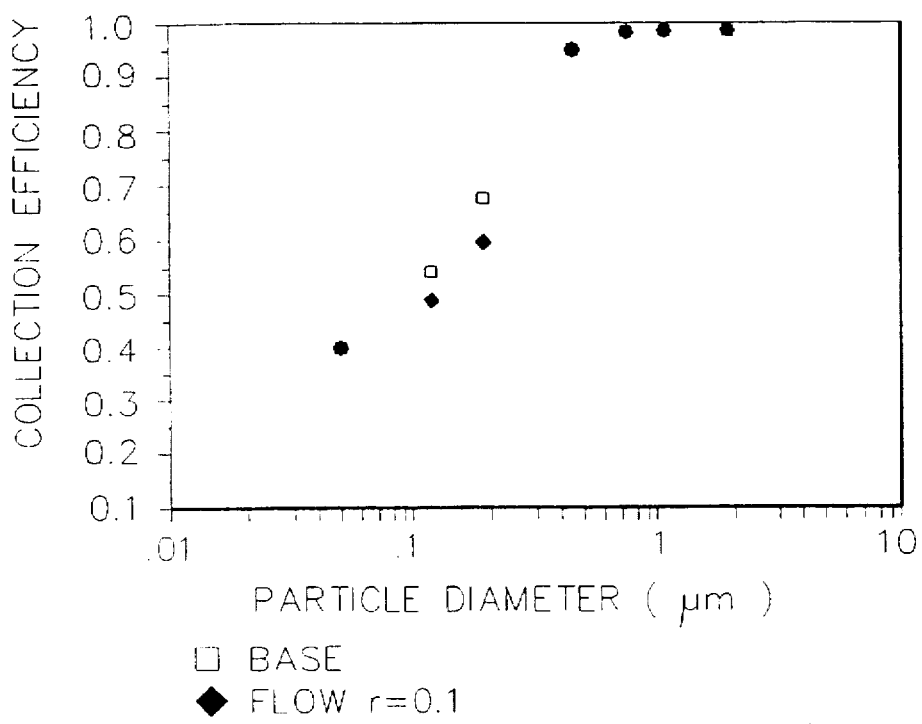
FIG. 13 shows plots comparing collection efficiency as a function of particle diameter for a virtual impactor for different ratios of minor flow to total flow.
Figure 14:
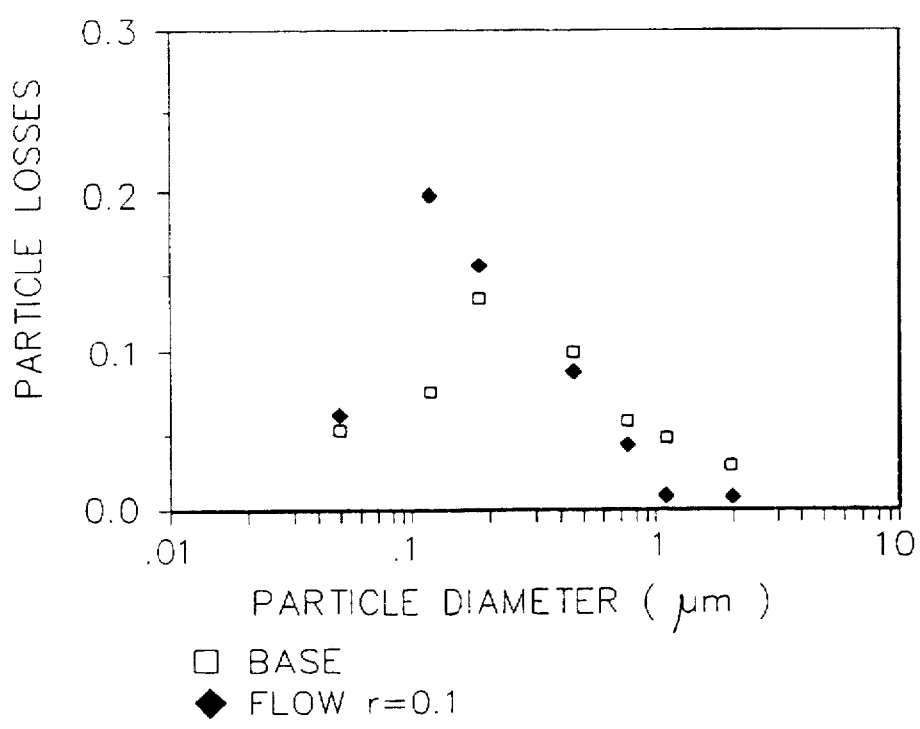
FIG. 14 shows plots comparing particle loss as a function of particle diameter for a virtual impactor for different ratios of minor flow to total flow.

The efficiency curve is shown in FIG. 13 along with the efficiency curve of the of the main configuration for comparison. Although flow ratio seems to have little effect on the collection efficiency, the decrease in the ratio of minor to total flow causes a small increase in the overall particle losses, particularly for particle sizes near the cutpoint (FIG. 14). This may be due to the higher local velocity around the tip of the collection nozzle resulting from a higher minor flow, which causes a stronger vacuum to be applied to the particles as they exit the acceleration nozzle and approach the proximity of the collection probe.

d. Effect of Increasing the Pressure Drop Across the Impactor's Nozzle

The effect of increasing the jet velocity and, correspondingly, the pressure drop across the virtual impactor was investigated using the main configuration of the virtual impactor. The ratio of the minor to total flow was maintained at 0.2 and the total sampling flow rate was 0.7 LPM, which produced a total pressure drop across the virtual impactor equal to 50 inches of water (or, equivalently, 0.12 atmospheres).

The results of this test are shown in Table 4.

TABLE 3

Particle collection characteristics of the virtual impactor with a minor flow ratio 0.1.

| Particle Diameter (μm) | (%) Collection efficiency | (%) in Major Flow (0.5 LPM) | (%) in Minor Flow (0.06 LPM) | (%) Total losses | (%) Losses on inlet of nozzle | (%) Losses on collection probe | (%) Other interstage losses |
|---|---|---|---|---|---|---|---|
| 0.05 | 39.9 | 55.0 | 36.5 | 8.4 | 0.9 | 2.6 | 4.9 |
| 0.12 | 50.2 | 38.8 | 39.1 | 22.1 | 5.5 | 10.2 | 6.4 |
| 0.20 | 58.3 | 34.0 | 47.5 | 18.8 | 6.4 | 10.9 | 1.5 |
| 0.45 | 94.5 | 5.1 | 87.8 | 9.0 | 3.1 | 4.2 | 1.7 |
| 0.75 | 99.7 | 0.3 | 94.5 | 5.2 | 3.2 | 1.4 | 0.6 |
| 1.10 | 99.8 | 0.2 | 98.1 | 1.2 | 1.2 | 0.0 | 0.0 |
| 2.00 | 100.0 | 0.0 | 98.9 | 1.1 | 0.7 | 0.4 | 0.0 | a. The values in the table represent averages of repeated runs.
b. Collection probe to acceleration nozzle ratio 1.4.
c. Acceleration nozzle diameter 0.035 cm.

TABLE 4

Particle collection characteristics of the virtual impactor with increased pressure drop equal to 0.12 atm.

| Particle Diameter (µm) | (%) Collection efficiency | (%) in Major Flow (0.56 LPM) | (%) in Minor Flow (0.14 LPM) | (%) Total losses | (%) Losses on inlet of nozzle | (%) Losses on collection probe | (%) Other interstage losses |
|---|---|---|---|---|---|---|---|
| 0.05 | 55.3 | 41.7 | 51.5 | 6.7 | 1.9 | 2.3 | 2.5 |
| 0.12 | 61.6 | 34.5 | 55.4 | 10.1 | 3.4 | 3.6 | 3.1 |
| 0.25 | 75.2 | 22.8 | 69.1 | 8.1 | 2.3 | 4.7 | 1.1 |
| 0.45 | 98.0 | 1.9 | 94.5 | 3.6 | 0.4 | 3.2 | 0.0 |
| 0.75 | 99.4 | 0.6 | 97.2 | 2.2 | 0.4 | 1.8 | 0.0 |
| 1.10 | 99.3 | 0.7 | 97.8 | 1.5 | 0.8 | 0.7 | 0.0 |
| 2.00 | 99.7 | 0.3 | 97.2 | 2.5 | 1.2 | 1.3 | 0.0 | a. The values in the table represent averages of repeated runs.
b. Minor flow ratio was 0.2.
c. Collection probe to acceleration nozzle ratio 1.4.
d. Acceleration nozzle diameter 0.035 cm.

Figure 15:
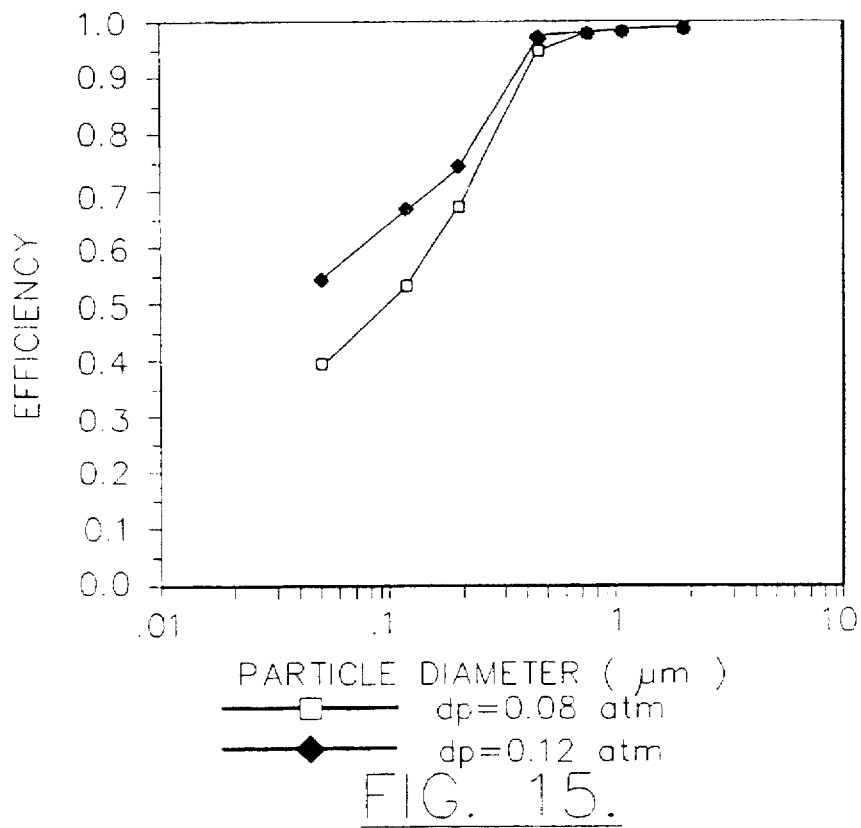
FIG. 15 shows plots comparing collection efficiency as a function of particle diameter for a virtual impactor subjected to varying pressure across the acceleration nozzle.
Figure 16:
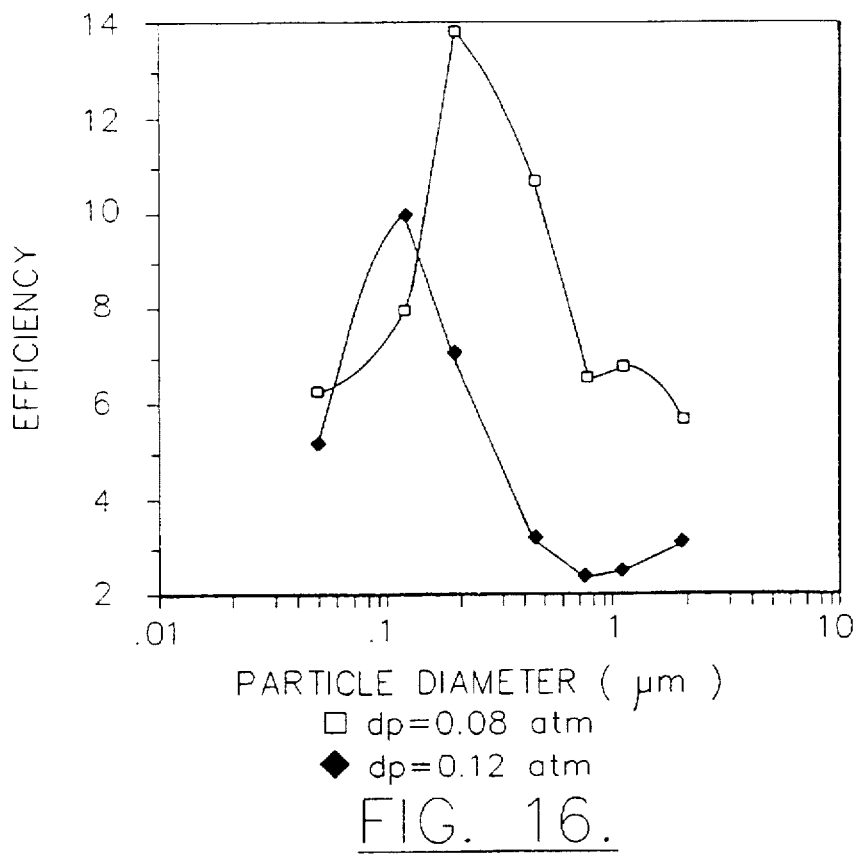
FIG. 16 shows plots comparing particle loss as a function of particle diameter for a virtual impactor subjected to varying pressure across the acceleration nozzle.

FIG. 15 shows the efficiency curves for the two pressure drops tested. The collection efficiency increases and the cutpoint decreases as the pressure drop across the virtual impactor increases. This is a direct result of the increase in the jet velocity and the subsequent decrease in the impactor's cutpoint. The particle losses decrease as the jet velocity increases (FIG. 16). This is a relatively surprising result, since an increase in the velocity would increase the Reynolds number and thus should increase the turbulence of the flow and the generated eddies around the tip of the collection nozzle, which should in turn result in higher particle losses. Particle losses were maximized at 0.12 µm, as opposed to the main configuration, wherein particle loss was maximized at 0.20 µm. This result is expected, as the impactor's 50% cutpoint, where the particle losses are maximized, has decreased.

EXAMPLE 6

Virtual Impactor with a Slotted Nozzle

To increase the flow rate of the virtual impactor of Example 1, two virtual impactors were constructed with rectangular acceleration nozzles and collector tubes. The nozzle for the first measured 0.550×0.0145 inches, and the nozzle for the second measured 0.550×0.0125 inches. For each, the collector tube measured 0.550×0.019 inches. In each instance the collector tube inlet was positioned relative to the acceleration nozzle outlet so that the longitudinal axes of each were substantially coaxial. The gap between the acceleration nozzle outlet and the collector tube inlet was 0.015 inches. The flow rate for the first virtual impactor was 45 LPM, which resulted in a pressure drop across the nozzle of 50 inches of water; the flow rate for the second configuration was 32 LPM, which resulted in a pressure drop of 70 inches of water.

Preparation of the particles for testing, the testing apparatus itself, and the test procedure were the same as that described in Examples 2–4.

EXAMPLE 7

Results of Slotted Virtual Impactor Testing

The results of the testing carried out on the virtual impactors of Example 6 are shown in Tables 5 and 6.

TABLE 5

Particle collection characteristics of a slotted virtual impactor having a slot width of 0.0145 inches

| Particle Size (µm) | % Collection Efficiency | % Particle Loss |
|---|---|---|
| 0.05 | 41.1 | 4.5 |
| 0.10 | 46.9 | 4.8 |
| 0.20 | 52.2 | 6.2 |
| 0.45 | 78.3 | 4.5 |
| 0.75 | 90.2 | 11.3 |
| 1.00 | 95.8 | 12.1 |

TABLE 6

Particle collection characteristics of a slotted virtual impactor having a slot width of 0.0125 inches

| Particle Size (µm) | % Collection Efficiency | % Particle Loss |
|---|---|---|
| 0.05 | 50.4 | 3.8 |
| 0.10 | 53.3 | 5.1 |
| 0.20 | 64.0 | 5.3 |
| 0.45 | 90.7 | 6.5 |
| 0.75 | 93.8 | 7.0 |
| 1.0 | 94.0 | 8.3 |

It can be seen that the cutpoint is approximately 0.12 µm, and that the overall particle loss is approximately 6 to 7 percent. These results indicate that the slotted design can have the efficiency of a round nozzle, and thus can be operative. In addition, due to the losses and ratio of inlet area to perimeter, the specific particle losses are considerably reduced. Furthermore, the concept of a slit impactor allows the use of higher sampling flows than those achieveable by round nozzle impactors. To be able to achieve high flows with round nozzles, a multitudes of nozzles should be used, which is an unduly complicated design with serious fabrication shortcomings. Moreover, the possible interaction between the multiple jets can deteriorate the performance characteristics of a multi-nozzle impactor.

The foregoing examples are illustrative of the present invention, and are not to be construed as limiting thereof. The invention is defined by the following claims, with equivalents of the claims to be included therein.

That which is claimed is:

1. A method for removing the particulate components of an airstream larger than 0.1 micron, said method comprising the steps of:

(a) passing a subsonic airstream through a nozzle having an outlet elongated in the lengthwise direction and a longitudinal axis normal to and passing through the center of said outlet;

(b) drawing a first portion of the airstream into a particle receiving chamber having an inlet, an outlet, and a longitudinal axis normal to and passing through the center of said particle receiving chamber inlet, the receiving chamber being positioned downstream from said outlet of said nozzle so that a lateral flow gap is formed between said nozzle means outlet and said particle receiving chamber inlet, and further being positioned so that said longitudinal axis of said nozzle and said longitudinal axis of said particle receiving chamber are substantially coaxial, so that substantially all of the particles of the airstream larger than 0.1 microns are drawn into the particle receiving chamber with the first portion of the airstream; and (c) drawing a second portion of the airstream through the gap between the nozzle outlet and the particle receiving chamber inlet, wherein the second portion of the airstream is substantially free of particles larger than 0.1 microns.

2. A process for providing an airstream with concentrated particulate matter larger than 0.1 microns comprising the steps of:

(a) passing a first subsonic airstream that includes a plurality of particulate components larger than 0.1 microns through a nozzle having an outlet elongated in the lengthwise direction and a longitudinal axis normal to and passing through the center of said outlet;

(b) drawing a minor portion of the first airstream into a particle receiving chamber having an inlet, an outlet, and a longitudinal axis normal to and passing through the center of said particle receiving chamber inlet, the receiving chamber being positioned downstream from said nozzle outlet so that a lateral flow gap is formed between said nozzle means outlet and said particle receiving chamber inlet, and further being positioned so that said longitudinal axis of said nozzle and said longitudinal axis of said receiving chamber are substantially coaxial, wherein substantially all of the particles contained in the first airstream larger than 0.1 micron are drawn into the receiving chamber with the minor portion of the airstream;

(c) drawing the major portion of the first airstream through the gap between the nozzle outlet and the particle receiving chamber inlet, wherein the major portion of the airstream is substantially free of particles larger than 0.1 microns;

wherein said concentrated airstream comprises said minor portion of the first airstream, in which the plurality of components of said particulate matter greater than 0.1 microns are present in essentially the same proportions to one another as in the first airstream and in greater concentration than in the first airstream; and (d) passing said concentrated airstream into a test chamber for administration to test subjects.

3. A method according to claim 2, wherein said step of drawing the major portion of the first airstream through the gap between the nozzle outlet and the particle receiving chamber inlet further comprises drawing more than about 80 percent of the airstream through the gap.

4. A method according to claim 2, wherein said passing step (a) further comprises passing an airstream of between about 20 and 1,000 liters per minute through the nozzle.

5. A method according to claim 2, further comprising repeating steps (a) through (c) on the minor portion of the airstream prior to performing step (d).

6. A process for providing essentially particle-free air to a particle-free chamber, said process comprising the steps of:

(a) passing a first subsonic airstream that includes a plurality of particulate components larger than 0.1 microns through a nozzle having an outlet elongated in the lengthwise direction and a longitudinal axis normal to and passing through the center of said outlet;

(b) drawing a minor portion of the first airstream into a particle receiving chamber having an inlet, an outlet, and a longitudinal axis normal to and passing through the center of said particle receiving chamber inlet, the receiving chamber being positioned downstream from said nozzle outlet so that a lateral flow gap is formed between said nozzle means outlet and said particle receiving chamber inlet, and further being positioned so that said longitudinal axis of said nozzle and said longitudinal axis of said receiving chamber are substantially coaxial, wherein substantially all of the particles contained in the first airstream larger than 0.1 micron are drawn into the receiving chamber with the minor portion of the airstream;

(c) drawing the major portion of the first airstream through the gap between the nozzle outlet and the particle receiving chamber inlet, wherein the major portion of the airstream is substantially free of particles larger than 0.1 microns;

wherein said airstream essentially free of particles larger than 0.1 microns comprises said major portion of the first airstream; and (d) passing said airstream essentially free of particles larger than 0.1 microns into a enclosed chamber such that the atmosphere within said chamber is essentially particle-free.

7. A method according to claim 6, wherein said step of drawing the major portion of the first airstream through the gap between the nozzle outlet and the particle receiving chamber inlet further comprises drawing more than about 80 percent of the airstream through the gap.

8. A method according to claim 6, wherein said passing step (a) further comprises passing an airstream of between about 20 and 1,000 liters per minute through the nozzle.

9. A method according to claim 6, wherein said airstream includes gaseous contaminants, and further comprising the step of collecting the gaseous contaminants contained in the major portion of the airstream prior to step (d).

10. A method according to claim 6, further comprising repeating steps (a) through (c) on the major portion of the airstream prior to performing step (d).

11. A method for removing particulate components larger than 0.1 micron from an airstream, said method comprising the steps of:

(a) passing a first airstream that includes a plurality of particulate components and traveling at subsonic velocity through a nozzle having an outlet elongated in the length direction, said nozzle outlet having a width dimension of between about 0.007 and 0.015 inches, said nozzle further having a longitudinal axis parallel to the airstream flow direction and normal to the width and length dimensions and passing through the center of said elongated outlet;

(b) drawing a minor portion of the first airstream into a particle receiving chamber having an inlet elongated in the length direction, the elongated inlet having a width dimension of between about 0.013 and 0.021 inches, the particle receiving chamber further having an outlet and a longitudinal axis parallel to the airstream flow direction and normal to the width and length dimensions and passing through the center of said elongated inlet, the receiving chamber being positioned downstream from said outlet of said nozzle so that a lateral flow gap of between about 0.008 and 0.015 inches is formed between said nozzle means outlet and said receiving means inlet, and further being positioned so that said longitudinal axis of said nozzle and said longitudinal axis of said receiving chamber are substantially coaxial and so that the width dimension of said nozzle outlet and the width dimension of said receiving chamber inlet are substantially parallel, wherein the particles of the airstream are drawn into the receiving chamber with the minor portion of the airstream; and (c) drawing a second portion of the airstream through the gap between the nozzle outlet and the particle receiving chamber inlet, wherein the second portion of the airstream is substantially free of particles larger than 0.1 microns.

12. A process for providing an airstream with concentrated particulate matter larger than 0.1 microns comprising the steps of:

(a) passing a first airstream that includes a plurality of particulate components and traveling at subsonic velocity through a nozzle having an outlet elongated in the length direction, said nozzle outlet having a width dimension of between about 0.007 and 0.015 inches, said nozzle further having a longitudinal axis parallel to the airstream flow direction and normal to the width and length dimensions and passing through the center of said elongated outlet;

(b) drawing a minor portion of the first airstream into a particle receiving chamber having an inlet elongated in the length direction, the elongated inlet having a width dimension of between about 0.013 and 0.021 inches, the particle receiving chamber further having an outlet and a longitudinal axis parallel to the airstream flow direction and normal to the width and length dimensions and passing through the center of said elongated inlet, the receiving chamber being positioned downstream from said outlet of said nozzle so that a lateral flow gap of between about 0.008 and 0.015 inches is formed between said nozzle means outlet and said receiving means inlet, and further being positioned so that said longitudinal axis of said nozzle and said longitudinal axis of said receiving chamber are substantially coaxial and so that the width dimension of said nozzle outlet and the width dimension of said receiving chamber inlet are substantially parallel, wherein the particles of the airstream are drawn into the receiving chamber with the minor portion of the airstream; and (c) drawing the major portion of the first airstream through the gap between the nozzle outlet and the particle receiving chamber inlet, wherein the major portion of the airstream is substantially free of particles larger than 0.1 microns;

wherein said concentrated airstream comprises said minor portion of the first airstream, in which the plurality of components of said particulate matter greater than 0.1 microns are present in essentially the same proportions to one another as in the first airstream and in greater concentration than in the first airstream; and (d) passing said concentrated airstream into a test chamber for administration to test subjects.

13. A method according to claim 12, wherein said step of drawing the major portion of the first airstream through the gap between the nozzle outlet and the particle receiving chamber inlet further comprises drawing more than about 80 percent of the airstream through the gap.

14. A method according to claim 12, wherein said passing step (a) further comprises passing an airstream of between about 20 and 1,000 liters per minute through the nozzle.

15. A method according to claim 12, further comprising repeating steps (a) through (c) on the minor portion of the airstream prior to performing step (d).

16. A process for providing essentially particle-free air to a particle-free chamber, said process comprising the steps of:

(a) passing a first airstream that includes a plurality of particulate components traveling at subsonic velocity through a nozzle having an outlet elongated in the length direction, said nozzle outlet having a width dimension of between about 0.007 and 0.015 inches, said nozzle further having a longitudinal axis parallel to the airstream flow direction and normal to the width and length dimensions and passing through the center of said elongated outlet;

(b) drawing a minor portion of the first airstream into a particle receiving chamber having an inlet elongated in the length direction, the elongated inlet having a width dimension of between about 0.013 and 0.021 inches, the particle receiving chamber further having an outlet and a longitudinal axis parallel to the airstream flow direction and normal to the width and length dimensions and passing through the center of said elongated inlet, the receiving chamber being positioned downstream from said outlet of said nozzle so that a lateral flow gap of between about 0.008 and 0.015 inches is formed between said nozzle means outlet and said receiving means inlet, and further being positioned so that said longitudinal axis of said nozzle and said longitudinal axis of said receiving chamber are substantially coaxial and so that the width dimension of said nozzle outlet and the width dimension of said receiving chamber inlet are substantially parallel, wherein the particles of the airstream are drawn into the receiving chamber with the minor portion of the airstream; and (c) drawing the major portion of the first airstream through the gap between the nozzle outlet and the particle receiving chamber inlet, wherein the major portion of the airstream is substantially free of particles larger than 0.1 microns;

wherein said airstream essentially free of particles larger than 0.1 microns comprises said major portion of the first airstream; and (d) passing said airstream essentially free of particles larger than 0.1 microns into an enclosed chamber such that the atmosphere within said chamber is essentially particle-free.

17. A method according to claim 16, wherein said step of drawing the major portion of the first airstream through the gap between the nozzle outlet and the particle receiving chamber inlet further comprises drawing more than about 80 percent of the airstream through the gap.

18. A method according to claim 16, wherein said passing step (a) further comprises passing an airstream of between about 20 and 1,000 liters per minute through the nozzle.

19. A method according to claim 16, wherein said airstream includes gaseous contaminants, and further comprising the step of collecting the gaseous contaminants contained in the major portion of the airstream prior to step (d).

20. A method according to claim 16, further comprising repeating steps (a) through (c) on the major portion of the airstream prior to performing step (d).

* * * * *